(12) United States Patent
Dai et al.

(10) Patent No.: US 12,440,388 B2
(45) Date of Patent: Oct. 14, 2025

(54) TWEEZER PART FOR VISUAL EAR PICK (71) Applicant: HEIFENG ZHIZAO (SHENZHEN) TECHNOLOGY CO., LTD, Guangdong (CN)

(72) Inventors: Bicheng Dai, Guangdong (CN); Yichun Lu, Guangdong (CN); Geyan Yu, Guangdong (CN)

(73) Assignee: HEIFENG ZHIZAO (SHENZHEN) TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/818,894

(22) Filed: Aug. 29, 2024

(65) Prior Publication Data
US 2025/0241797 A1    Jul. 31, 2025

(30) Foreign Application Priority Data
Jan. 31, 2024  (CN) .......................... 202420249220.7

(51) Int. Cl.
*A61F 11/00*    (2022.01)
(52) U.S. Cl.
CPC .................... *A61F 11/006* (2013.01)

(58) Field of Classification Search
CPC .................... A61B 2017/305; A61F 11/006
See application file for complete search history.

(56) References Cited

U.S. PATENT DOCUMENTS

| | | | | |
|---|---|---|---|---|
| 2001/0056286 A1* | 12/2001 | Etter | .................. | A61B 17/2909 606/205 |
| 2020/0229702 A1* | 7/2020 | Sekowski | .............. | A61B 90/37 |

* cited by examiner

*Primary Examiner* — Anh T Dang
(74) *Attorney, Agent, or Firm* — HOWARD M COHN and Associates, LLC (57) ABSTRACT

The present invention relates to the technical field of visual ear picks. By the arrangement of the driving portion and the straight tube portion, the driving portion is assembled on the visual ear pick. One end of the straight tube portion is connected to the driving portion; and the straight tube portion movably sleeves the visual ear pick, so that the driving portion can drive the straight tube portion to move on the visual ear pick in the axial direction of the straight tube portion. When the tweezer head is assembled on the visual ear pick, the other end of the straight tube portion is opposite to the tweezer head. Therefore, the driving portion drives the straight tube portion to move on the visual ear pick in the axial direction of the straight tube portion, which can conveniently enable the tweezer head to achieve the function of a tweezer.

12 Claims, 6 Drawing Sheets

TWEEZER PART FOR VISUAL EAR PICK

CROSS-REFERENCE TO RELATED APPLICATION

This patent application claims the benefit and priority of Chinese Patent Application No. 202420249220.7 filed with the China National Intellectual Property Administration on Jan. 31, 2024, the disclosure of which is incorporated by reference herein in its entirety as part of the present application.

TECHNICAL FIELD

The present disclosure relates to the technical field of visual ear picks, and in particular, to a tweezer part for a visual ear pick.

BACKGROUND

With the rapid development of science and technology, the quality of life has been significantly improved. Especially in the field of health care, the emergence of various advanced equipment has brought great convenience to people's daily lives. A visual ear pick, as a perfect combination of modern technology and traditional care, has become a popular nursing tool on the market due to its unique functions and advantages.

The visual ear pick includes a camera, a wireless transmission module, a pick portion, and a handle. The camera is cleverly arranged at a connection between the pick portion and the handle, and can capture clear images of the inside of the ear canal. These images are transmitted in real time to a visual terminal such as a mobile phone through the wireless transmission module, so that a user can intuitively observe the situation inside the ear canal. With this intuitive visual feedback, the user can more accurately determine the position and size of ear wax, making it easier to use the pick portion to remove the ear wax.

However, in practical use, if there is particularly large or hard ear wax, the ordinary pick portion may not be able to completely remove the ear wax. At this time, a user may need to replace the pick portion on the visual ear pick with a tweezer head to clamp the large piece of ear wax. In theory, this design sounds very practical, but the volume of the visual ear pick is relatively large, which occupies a large space in the ear canal. This makes it difficult for the tweezer head to work in conjunction with the handle. Due to the space limitation and the inconvenience of operation, using the tweezer head may become very difficult.

SUMMARY

The embodiments of the present disclosure provide a tweezer part for a visual ear pick, which can solve the problem that it is very hard to use a tweezer head if the tweezer head is assembled on a visual ear pick.

The present disclosure provides a tweezer part for a visual ear pick, which applied to a visual ear pick and configured to drive a tweezer head assembled on the visual ear pick. The tweezer part includes:
  a driving portion, configured to be assembled on the visual ear pick; and
  a straight tube portion, wherein one end of the straight tube portion is connected to the driving portion, and the straight tube portion is movably arranged on the visual ear pick and resists against the tweezer head;
  when the driving portion is pressed, the driving portion drives the straight tube portion to move towards the tweezer head in an axial direction of the straight tube portion, and the straight tube portion pushes the tweezer head, so that the tweezer head is in a clamping state; and
  when the driving portion is released, the driving portion drives the straight tube portion to move away from the tweezer head in the axial direction of the straight tube portion, and the straight tube portion is separated from the tweezer head, so that the tweezer head is in a releasing state.

In one embodiment, the driving portion includes a connecting seat and a pressing portion.

The connecting seat is configured to be assembled on the visual ear pick; and

The pressing portion is connected to the connecting seat; a gap is provided between the pressing portion and the connecting seat; the pressing portion is further connected to one end of the straight tube portion away from the tweezer head;
  when the pressing portion is pressed, the pressing portion deforms, and drives the straight tube portion to move towards the tweezer head in the axial direction of the straight tube portion; and
  when the pressing portion is released, the pressing portion returns to an original shape, and drives the straight tube portion to move away from the tweezer head in the axial direction of the straight tube portion.

In one embodiment, the pressing portion includes two first elastic plates and a second elastic plate.

The two first elastic plates are arranged on two opposite sides of the connecting seat, and the two first elastic plates are respectively connected to two opposite side walls of the connecting seat; gaps are respectively reserved between the two first elastic plates and the side walls of the connecting seat; Two opposite ends of the second elastic plate are respectively connected to the two first elastic plates; the second elastic plate is further connected to one end of the straight tube portion away from the tweezer head;
  when the two first elastic plates are pressed towards each other, the two first elastic plates deform and drive the second elastic plate to deform away from the connecting seat; the second elastic plate drives the straight tube portion to move towards the tweezer head in the axial direction of the straight tube portion;
  when the two first elastic plates are released, the two first elastic plates return to original shapes and drive the second elastic plate to return to an original shape; and the second elastic plate drives the straight tube portion to move away from the tweezer head in the axial direction of the straight tube portion.

In one embodiment, the first elastic plates and the second elastic plate are arc-shaped plates, and the first elastic plates and the second elastic plate are bent away from the connecting seat.

In one embodiment, the pressing portion further includes:
  connectors, wherein the connectors are arranged between the first elastic plates and a circumferential side wall of the connecting seat; one end of each connector is connected to each first elastic plate; and the other end of the connector is connected to the circumferential side wall of the connecting seat.

In one embodiment, the pressing portion includes:
  a U-shaped plate, wherein the connecting seat is arranged in a U-shaped groove structure of the U-shaped plate; two opposite ends of the U-shaped plate are integrally connected to the connecting seat respectively; a gap is reserved between the U-shaped plate and the connecting seat; the U-shaped plate is further connected to the end of the straight tube portion away from the tweezer head;

when the U-shaped plate is pressed, the U-shaped plate deforms, and drives the straight tube portion to move towards the tweezer head in the axial direction of the straight tube portion; and when the U-shaped plate is released, the U-shaped plate returns to an original shape, to drive the straight tube portion to move away from the tweezer head in the axial direction of the straight tube portion.

In one embodiment, the driving portion further includes an elastic member; the elastic member is arranged between the connecting seat and the pressing portion; and two opposite ends of the elastic member are respectively connected to the connecting seat and the pressing portion.

In one embodiment, the connecting seat is provided with a first assembling hole; the pressing portion is provided with a second assembling hole; and the first assembling hole and the second assembling hole are configured to insert the visual car pick.

In one embodiment, the straight tube portion is detachably connected to the second assembling hole, and the first assembling hole, the second assembling hole, and the straight tube portion are coaxially arranged.

In one embodiment, the second assembling hole is a threaded hole, and one end of the straight tube portion is in threaded connection with the second assembling hole.

In one embodiment, the connecting seat is provided with an accommodating chamber structure; the accommodating chamber structure is communicated to the first assembling hole; the visual ear pick is inserted into the first assembling hole; and a portion of the visual ear pick is located inside the accommodating chamber structure.

The tweezer part for the visual ear pick in the embodiments of the present disclosure has the technical effects: By the arrangement of the driving portion and the straight tube portion, the driving portion is assembled on the visual car pick, and one end of the straight tube portion is connected to the driving portion; and the straight tube portion movably sleeves the visual car pick, so that the driving portion can drive the straight tube portion to move on the visual ear pick in the axial direction of the straight tube portion. When the tweezer head is assembled on the visual ear pick, the other end of the straight tube portion is opposite to the tweezer head, so that the driving portion can be pressed to drive the straight tube portion to move towards the tweezer head in the axial direction of the straight tube portion, and the straight tube portion pushes the tweezer head, making a distance between opening ends of the tweezer head will gradually decrease until the tweezer head abuts against and clamps an object, thereby achieving a clamping function of the tweezer. At this time, the tweezer head is in a clamping state. When the driving portion is released, the driving portion drives the straight tube portion to move away from the tweezer head in the axial direction of the straight tube portion, so that the straight tube portion is separated from the tweezer head, making the distance between the opening ends of the tweezer head will gradually increase until the tweezer head releases the clamped object. At this time, the tweezer head is in a releasing head. Therefore, the driving portion drives the straight tube portion to move on the visual ear pick in the axial direction of the straight tube portion, which can conveniently enable the tweezer head to achieve the function of a tweezer. It is very convenient to use.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

In order to make the aims, technical solution and advantages of the present disclosure will be clearly, the present disclosure is further described below in combination with accompanying drawings and implementations. It should be understood that the specific embodiments described herein are intended only to explain the present disclosure and are not intended to define the present disclosure.

Due to a relatively large volume, a visual ear pick in the prior art occupies a large space in the ear canal after being inserted into the ear canal, making it difficult for a tweezer head to work in conjunction with the visual ear pick. As a result, it is very hard to use the tweezer head on the visual ear pick.

Figure 1:
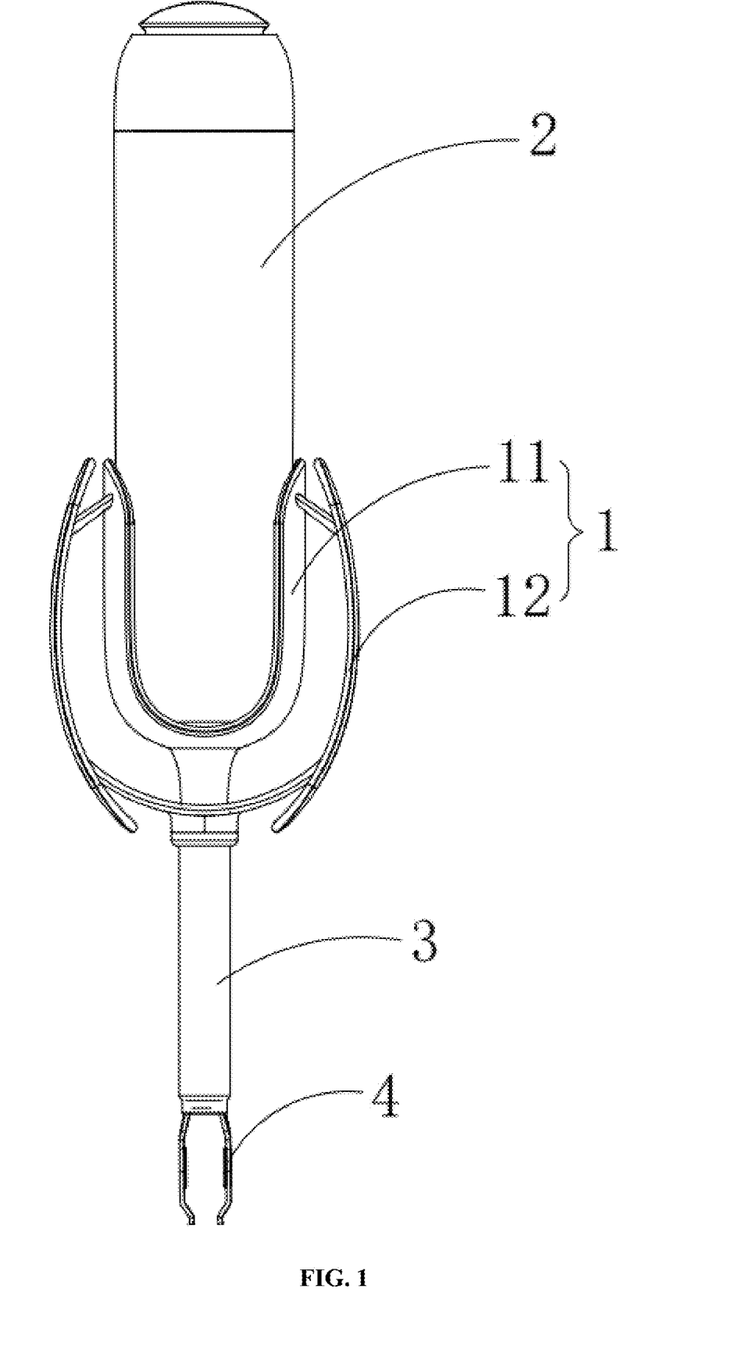
FIG. 1 is a schematic structural diagram of assembling a tweezer part for a visual ear pick on a visual ear pick according to an embodiment of the present disclosure.
Figure 2:
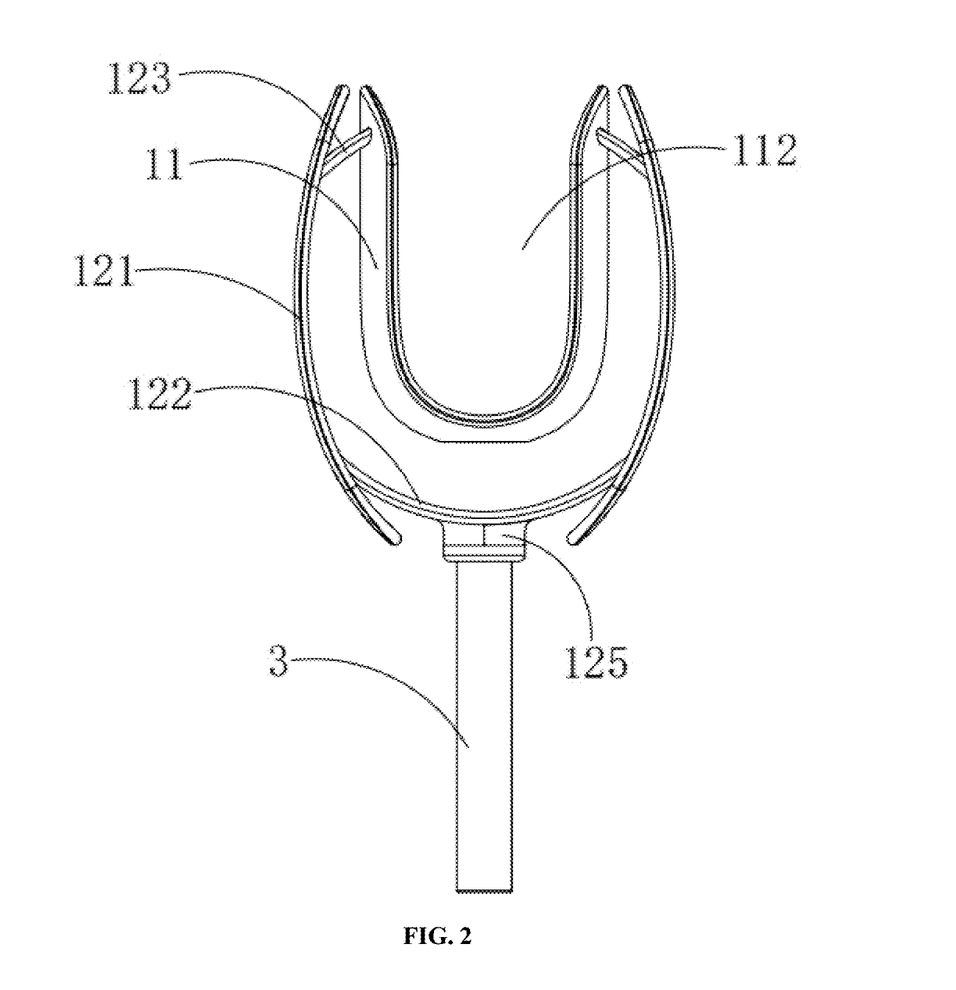
FIG. 2 is a front view of a tweezer part for a visual ear pick according to an embodiment of the present disclosure.
Figure 3:
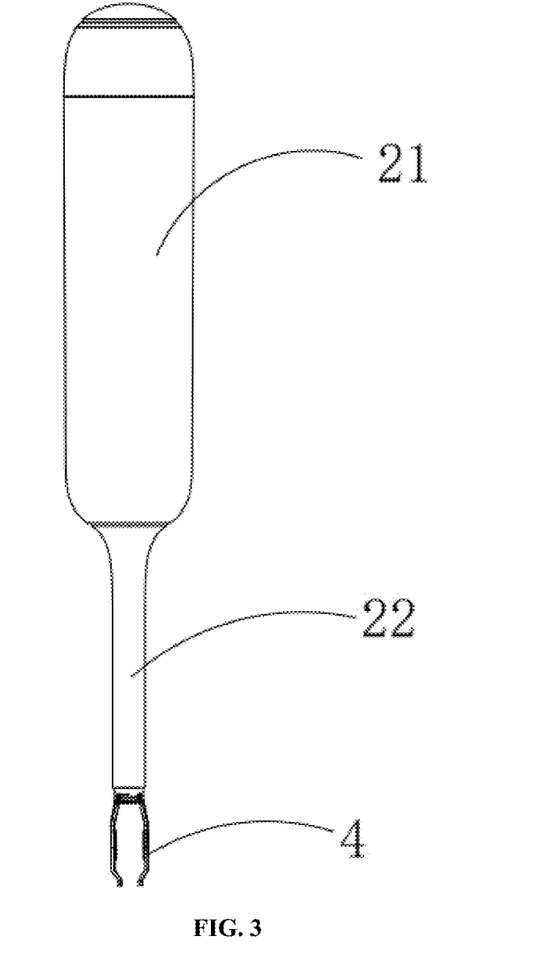
FIG. 3 is a schematic structural diagram of assembling a tweezer part on a visual ear pick according to an embodiment of the present disclosure.

Referring to FIG. 1, FIG. 2, and FIG. 3, to solve the above technical problems, the present disclosure provides a tweezer head for a visual ear pick, applied to a visual ear pick 2 and configured to drive a tweezer head 4 assembled on the visual ear pick 2. The tweezer part includes a driving portion 1 and a straight tube portion 3 which are assembled on the visual ear pick 2.

One end of the straight tube portion 3 is connected to the driving portion 1, and the straight tube portion 3 is movably arranged on the visual ear pick 2 and resists against the tweezer head 4.

When the driving portion 1 is pressed, the driving portion 1 drives the straight tube portion 3 to move towards the tweezer head 4 in an axial direction of the straight tube portion, and the straight tube portion 3 pushes the tweezer head 4, so that the tweezer head 4 is in a clamping state.

When the driving portion 1 is released, the driving portion 1 drives the straight tube portion 3 to move away from the tweezer head 4 in the axial direction of the straight tube portion, and the straight tube portion 3 is separated from the tweezer head 4, so that the tweezer head 4 is in a releasing state.

Specifically, the visual ear pick 2 may include a handle portion 21 and a hose portion 22. The handle portion 21 and the hose portion 22 are connected end to end. A pick part or the tweezer head 4 can be assembled at one end of the hose portion 22. A user can hold the handle portion 21 with a hand and insert one end of the hose portion 22 into the ear canal to clean the ear canal through the pick part or the tweezer head 4.

When the visual ear pick 2 needs to be used to clean stubborn ear wax, the tweezer part for the visual ear pick can be assembled on the visual ear pick 2 first, and then the tweezer head 4 can be assembled at one end of the hose portion 22 away from the handle portion 21. Preferably, the tweezer head 4 is in threaded connection with the hose portion 22.

The driving portion 1 can be assembled on the visual ear pick 2. Preferably, the driving portion 1 is assembled at a connection between the handle portion 21 and the hose portion 22. One end of the straight tube portion 3 can be connected to the driving portion 1, and the straight tube portion 3 is movably arranged on the visual ear pick 2. In this embodiment, the straight tube portion 3 is a long straight tube with the same inner diameter. An inner diameter of the straight tube portion 3 matches an outer diameter of the hose portion 22. The straight tube portion 3 can movably sleeve the hose portion 22, so that the straight tube portion 3 can slide along the hose portion 22. One end of the straight tube portion 3 away from the driving portion 1 can resist against the tweezer head 4.

A user can press the driving portion 1 to drive the straight tube portion 3 to move towards the tweezer head 4 in an axial direction of the straight tube portion, so that the straight tube portion 3 can push the tweezer head 4, and a portion of the tweezer heads 4 is pushed into the straight tube portion 3. Since two opposite ends of the tweezer head 4 are smaller than the middle portion of the tweezer head, as one end of the tweezer head 4 is inserted into the straight tube portion 3, a distance of the other end of the tweezer head 4 will gradually decrease. Namely, a distance between opening ends of the tweezer head 4 will gradually decrease until the tweezer head tightly abuts against and clamps an object, thus achieving the clamping function of a tweezer. At this time, the tweezer head 4 is in a clamping state.

When the driving portion 1 is released, the driving portion 1 drives the straight tube portion 3 to move away from the tweezer head 4 in the axial direction of the straight tube portion, and the straight tube portion 3 is separated from the tweezer head 4, so that the distance between the opening ends of the tweezer head 4 will gradually increase until the tweezer head 4 releases the clamped object. At this time, the tweezer head 4 is in a releasing state.

Therefore, the driving portion 1 can be pressed or released to drive the straight tube portion 3 to move on the visual ear pick 2 in the axial direction of the straight tube portion, so that the straight tube portion 3 can push the tweezer head 4 or be separated from the tweezer head 4, thereby driving the tweezer head 4 to achieve the function of the tweezer. Furthermore, the driving portion 1 is assembled on the handle portion 21 of the visual ear pick 2. During the cleaning of the ear canal, the driving portion 1 is located outside the ear canal, so that it is very convenient to press the driving portion 1, making the tweezer head 4 very convenient to use.

As shown in FIG. 1, FIG. 2, and FIG. 3, in some embodiments, the driving portion 1 includes a connecting seat 11 and a pressing portion 12. The connecting seat 11 is configured to be assembled on the visual ear pick 2; the pressing portion 12 is connected to the connecting seat 11; a gap is provided between the pressing portion 12 and the connecting seat 11; the pressing portion 12 is further connected to one end of the straight tube portion 3 away from the tweezer head 4; when the pressing portion 12 is pressed, the pressing portion 12 deforms, and drives the straight tube portion 3 to move towards the tweezer head 4 in the axial direction of the straight tube portion; and when the pressing portion 12 is released, the pressing portion 12 returns to an original shape, and drives the straight tube portion 3 to move away from the tweezer head 4 in the axial direction of the straight tube portion.

Specifically, the connecting seat 11 can be assembled onto the visual ear pick 2. Preferably, the connecting seat 11 is assembled on the handle portion 21 of the visual ear pick 2, and the connecting seat 11 is partially located at a connection between the handle portion 21 and the hose portion 22.

The pressing portion 12 can be connected to a side wall of the connecting seat 11. A gap is reserved between the pressing portion 12 and the side wall of the connecting seat 11, so that there is a space to press the pressing portion 12 towards the connecting seat 11. The pressing portion 12 further extends towards the hose portion 22, so that when the straight tube portion 3 movably sleeves the hose portion 22, one end of the straight tube portion 3 can be connected to the pressing portion 12.

When the pressing portion 12 is pressed towards the connecting seat 11, the pressing portion 12 may deform towards the connecting seat 11, so that the pressing portion 12 can drive the straight tube portion 3 to move towards the tweezer head 4 in the axial direction of the straight tube portion. The straight tube portion 3 can push the tweezer head 4 to make the tweezer head 4 clamp an object. When the pressing portion 12 is released, the pressing portion 12 will return to its original shape due to its elasticity. In the process of returning to the original shape, the pressing portion 12 can drive the straight tube portion 3 to move away from the tweezer head 4 in the axial direction of the straight tube portion, so that the straight tube portion 3 is separated from the tweezer head 4, and the tweezer head 4 releases the clamped object.

Therefore, the pressing portion 12 can be assembled on the handle portion 21 of the visual ear pick 2 through the connecting seat 11, so that the pressing portion 12 is located outside the ear canal. The pressing portion 12 can easily drive the straight tube portion 3 to push or be separated from the tweezer head 4, making it convenient to use the tweezer head 4.

As shown in FIG. 2, in some embodiments, the pressing portion 12 includes two first elastic plates 121 and a second elastic plate 122. Two first elastic plates 121 are arranged on two opposite sides of the connecting seat 11, and the two first elastic plates 121 are respectively connected to two opposite side walls of the connecting seat 11. Gaps are respectively reserved between the two first elastic plates 121 and the side walls of the connecting seat 11. Two opposite ends of the second elastic plate 122 are respectively connected to the two first elastic plates 121. The second elastic plate 122 is further connected to one end of the straight tube portion 3 away from the tweezer head 4. When the two first elastic plates 121 are pressed towards each other, the two first elastic plates 121 deform and drive the second elastic plate 122 to deform away from the connecting seat 11; and the second elastic plate 122 drives the straight tube portion 3 to move towards the tweezer head 4 in the axial direction of the straight tube portion. When the two first elastic plates 121 are released, the two first elastic plates 121 return to original shapes and drive the second elastic plate 122 to return to an original shape; and the second elastic plate 122 drives the straight tube portion 3 to move away from the tweezer head 4 in the axial direction of the straight tube portion.

Specifically, the two first elastic plates 121 are elastic and can return to the original shapes after being pushed to deform. The two first elastic plates 121 can be arranged on the two opposite sides of the connecting seat 11 respectively, and the two first elastic plates 121 are respectively connected to the two opposite side walls of the connecting seat 11. The gaps are respectively reserved between the two first elastic plates 121 and the side walls of the connecting seat 11. Thus, when a user holds the handle portion 21 of the visual ear pick 2, the user can press the two first elastic plates 121 respectively with two fingers. It can be convenient to press the two first elastic plates 121, and the operation is easy.

The second elastic plate 122 is elastic too and can return to its original shape after being pushed to deform. The second elastic plate 122 is arranged on one sides of the two first elastic plates 121 close to the straight tube portion 3, and the two opposite ends of the second elastic plate 122 are respectively connected to the two first elastic plates 121. The second elastic plate 122 can be further connected to one end of the straight tube portion 3, so that the two first elastic plates 121, the second elastic plate 122, and the straight tube portion 3 can be connected together in sequence. When the two first elastic plates 121 deform, the straight tube portion 3 can be driven to move by the second elastic plate 122.

More clearly, when the two first elastic plates 121 are pressed towards each other, the two first elastic plates 121 may deform towards the connecting seat 11, and the two first elastic plates can drive the second elastic plate 122 to deform away from the connecting seat 11, so that the second elastic plate 122 can drive the straight tube portion 3 to move away from the connecting seat 11 in the axial direction of the straight tube portion, or in other words, the second elastic plate 122 can drive the straight tube portion 3 to move towards the tweezer head 4, enabling the straight tube portion 3 to push the tweezer head 4. After being pushed to an extent, the tweezer head 4 can clamp an object.

When the two first elastic plates 121 are released, the two first elastic plates 121 may return to their original shapes. In the process of returning to their original shapes, the second elastic plate 122 can be driven to return to its original shape. The second elastic plate 122 can return to the original shape in the direction close to the connecting seat 11, thereby driving the straight tube portion 3 to move towards the connecting seat 11 in the axial direction of the straight tube portion. Or, in other words, the straight tube portion 3 can be driven to move away from the tweezer head 4, so that the straight tube portion 3 can be separated from the tweezer head 4, and the tweezer head 4 can release the clamped object. Therefore, a user can press the two first elastic plates 121 with two fingers to drive the tweezer head 4 to clean ear wax. The operation is easy.

Figure 4:
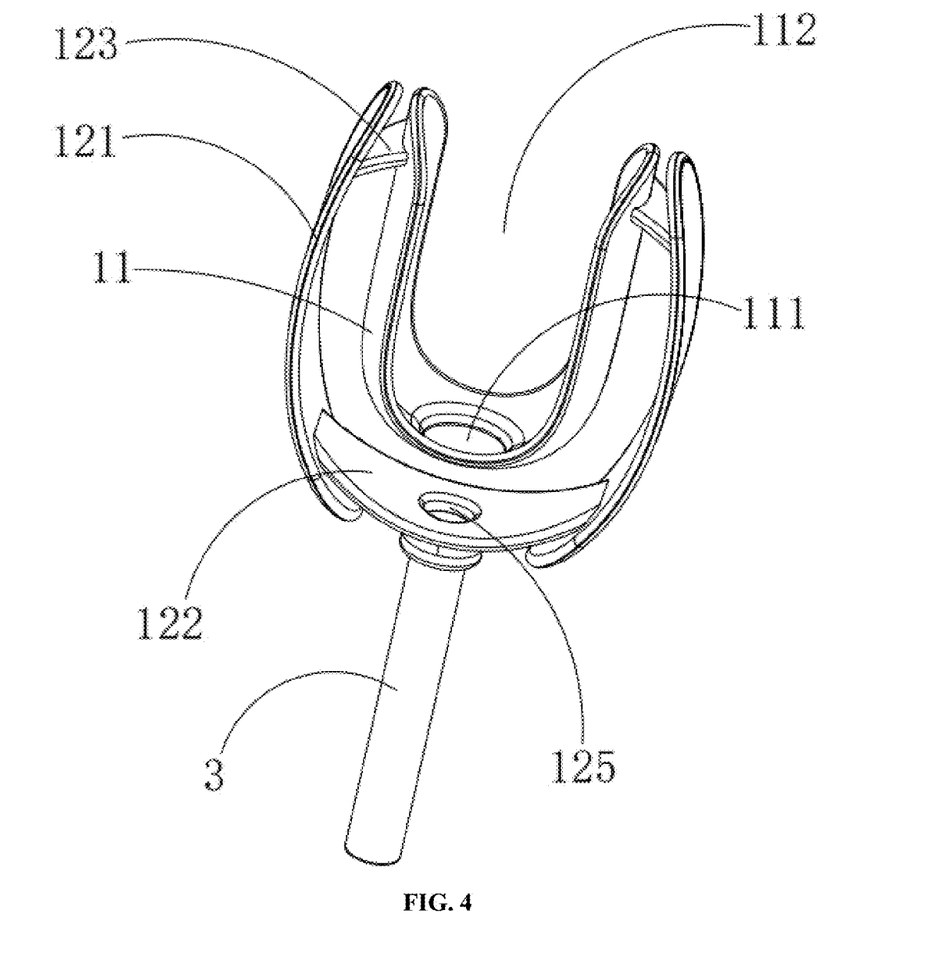
FIG. 4 is a three-dimensional diagram of a first tweezer part for a visual ear pick according to an embodiment of the present disclosure.

As shown in FIG. 2 and FIG. 4, in some embodiments, the first elastic plates 121 and the second elastic plate 122 are arc-shaped plates, and the first elastic plates 121 and the second elastic plate 122 are bent away from the connecting seat 11.

Specifically, the first elastic plates 121 and the second elastic plate 122 are arc-shaped plates, and the two first elastic plates 121 are bent away from each other. Or, in other words, the two first elastic plates 121 are bent away from the connecting seat 11, so that the two first elastic plates 121 protrude away from the connecting seat 11, making it easy to press the two first elastic plates 121. The second elastic plate 122 can be bent away from the connecting seat 11 too, so that the second elastic plate 122 protrudes away from the connecting seat 11 too, which can facilitate the second elastic plate 122 to drive the straight tube portion to move towards the tweezer head 4.

As shown in FIG. 2 and FIG. 4, in some embodiments, the pressing portion 12 further includes connectors 123. The connectors 123 are arranged between the first elastic plates 121 and a circumferential side wall of the connecting seat 11; one end of each connector 123 is connected to each first elastic plate 121; and the other end of the connector 123 is connected to the circumferential side wall of the connecting seat 11.

Specifically, the pressing portion 12 may further includes the connectors 123. The connectors 123 can be arranged between the first elastic plates 121 and the circumferential side wall of the connecting seat 11; one end of each connector 123 is connected to each first elastic plates 121; and the other end of the connector 123 is connected to the circumferential side wall of the connecting seat 11. Thus, the gaps can be reserved between the first elastic plates 121 and the connecting seat 11, so that it can be convenient to press the first elastic plates 121.

Figure 5:
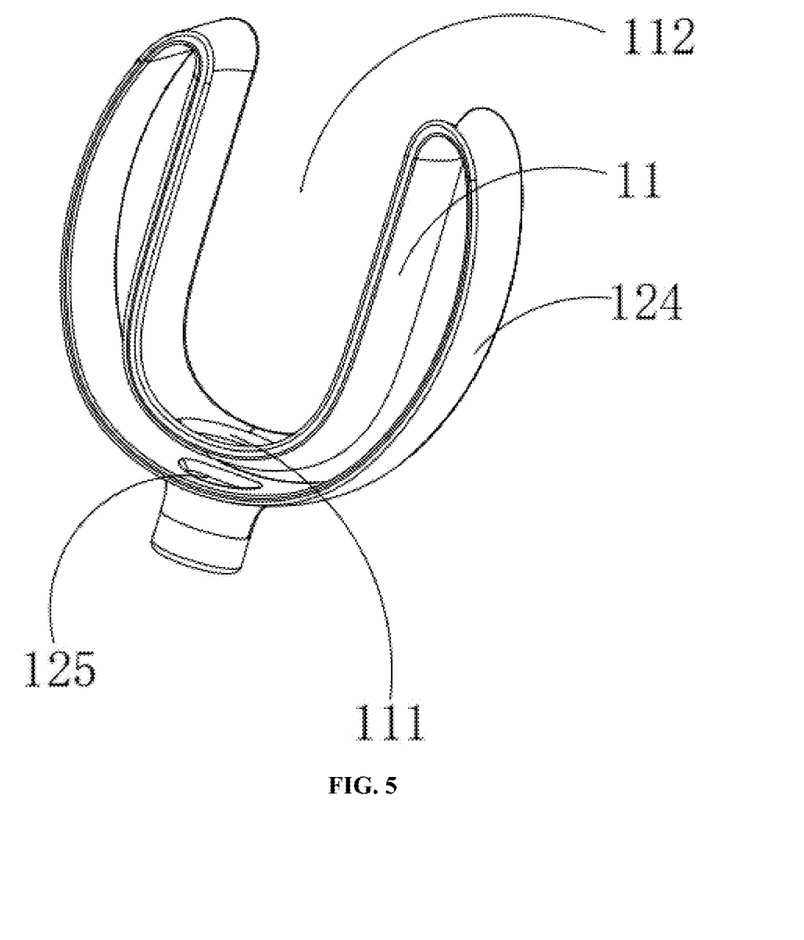
FIG. 5 is a three-dimensional diagram of a second tweezer part for a visual ear pick according to an embodiment of the present disclosure.

As shown in FIG. 5, in some embodiments, the pressing portion 12 includes a U-shaped plate 124. The connecting seat 11 is arranged in a U-shaped groove structure of the U-shaped plate 124; two opposite ends of the U-shaped plate 124 are integrally connected to the connecting seat 11 respectively; a gap is reserved between the U-shaped plate 124 and the connecting seat 11; the U-shaped plate 124 is further connected to the end of the straight tube portion 3 away from the tweezer head 4; when the U-shaped plate 124 is pressed, the U-shaped plate 124 deforms, and drives the straight tube portion 3 to move towards the tweezer head 4 in the axial direction of the straight tube portion; and when the U-shaped plate 124 is released, the U-shaped plate 124 returns to an original shape, to drive the straight tube portion 3 to move away from the tweezer head 4 in the axial direction of the straight tube portion.

Specifically, the pressing portion 12 may have various structures. In this embodiment, the pressing portion 12 may include the U-shaped plate 124, and the connecting seat 11 is arranged in the U-shaped groove structure of the U-shaped plate 124. The two opposite ends of the U-shaped plate 124 are integrally connected to the connecting seat 11 respectively, and the gap is reserved between the U-shaped plate 124 and the connecting seat 11, so that the U-shaped plate 124 can be pressed relative to the connecting seat 11. A closed end of the U-shaped plate 124 can be further connected to the end of the straight tube portion 3 away from the tweezer head 4.

When the U-shaped plate 124 is pressed, the two opposite sides of the U-shaped plate 124 deform towards the connecting seat 11, so that the closed end of the U-shaped plate 124 deforms away from the connecting seat 11. Or, in other words, the closed end of the U-shaped plate 124 deforms towards the tweezer head 4, thereby driving the straight tube portion 3 to move towards the tweezer head 4 in the axial direction of the straight tube portion, so that the tweezer head 4 can clamp an object.

When the U-shaped plate 124 is released, the U-shaped plate 124 may return to the original shape, so that the closed end of the U-shaped plate 124 returns to the original shape towards the connecting seat 11. Or, in other words, the closed end of the U-shaped plate 124 returns to the original shape away from the tweezer head 4, so that the straight tube portion 3 can be driven to move towards one end away from the tweezer head 4 in the axial direction of the straight tube portion, and the tweezer head 4 can release the clamped object.

Figure 6:
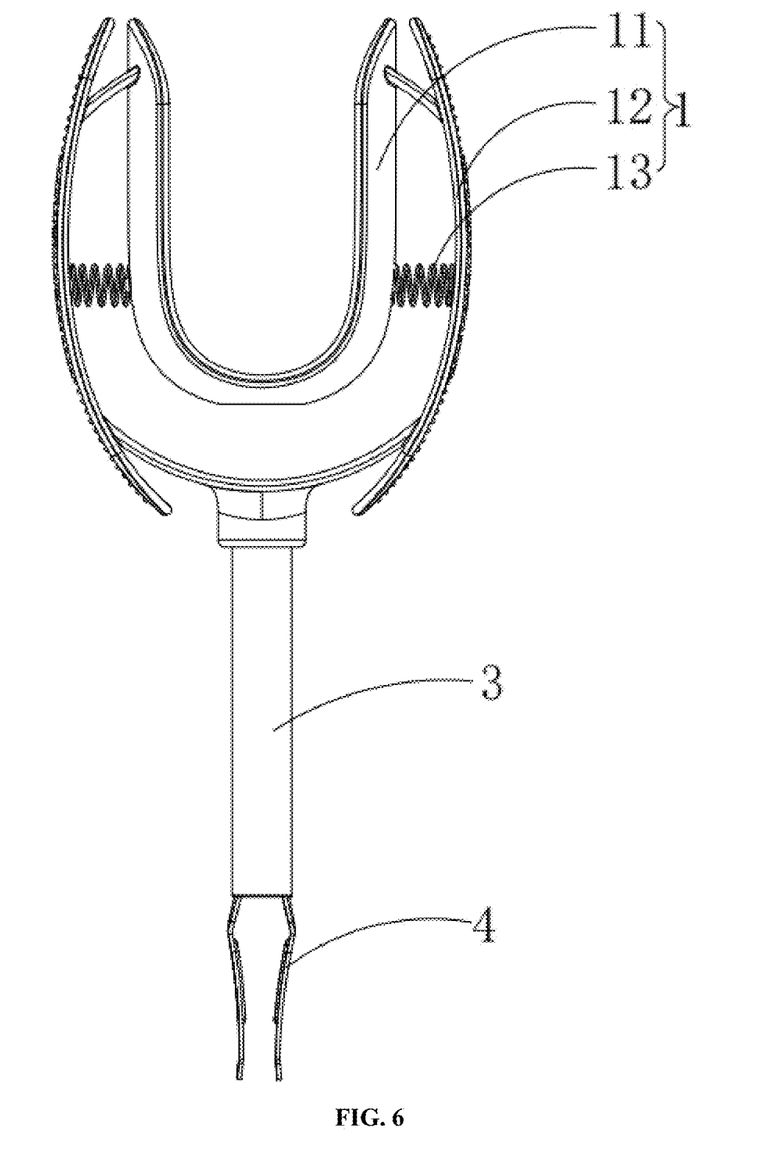
FIG. 6 is a front view of a third tweezer part for a visual ear pick according to an embodiment of the present disclosure.

As shown in FIG. 6, in some embodiments, the driving portion 1 further includes an elastic member 13; the elastic member 13 is arranged between the connecting seat 11 and the pressing portion 12; and two opposite ends of the elastic member 13 are respectively connected to the connecting seat 11 and the pressing portion 12.

Specifically, the driving portion 1 may further include the elastic member 13; the elastic member 13 may be arranged in the gap between the connecting seat 11 and the pressing portion 12; and the two opposite ends of the elastic member 13 are respectively connected to the connecting seat 11 and the pressing portion 12. Preferably, the elastic member 13 is a spiral spring.

When the pressing portion 12 is pressed towards the connecting seat 11, the pressing portion 12 may deform towards the connecting seat 11. At this time, the elastic member 13 is compressed. If the pressing portion 12 is released, the elastic member 13 may drive the pressing portion 12 to return to the original shape, so that it can be convenient to use the pressing portion 12 to drive the tweezer head 4.

As shown in FIG. 1 and FIG. 4, in some embodiments, the connecting seat 11 is provided with a first assembling hole 111; the pressing portion 12 is provided with a second assembling hole 125; and the first assembling hole 111 and the second assembling hole 125 are configured to insert the visual ear pick 2.

Specifically, the connecting seat 11 may be provided with the first assembling hole 111, and the pressing portion 12 may be provided with the second assembling hole 125. In this embodiment, the second assembling hole 125 may be provided on the second elastic plate 122, and the visual ear pick 2 may be inserted into the first assembling hole 111 and the second assembling hole 125, so that the connecting seat 11 is assembled on the visual ear pick 2, and the pressing portion 12 is assembled on the visual ear pick 2 too. The mounting operation is very convenient.

As shown in FIG. 1 and FIG. 4, in some embodiments, the straight tube portion 3 is detachably connected to the second assembling hole 125, and the first assembling hole 111, the second assembling hole 125, and the straight tube portion 3 are coaxially arranged.

Specifically, the end of the straight tube portion 3 away from the tweezer head 4 is detachably connected to the second assembling hole 125, and the first assembling hole 111, the second assembling hole 125, and the straight tube portion 3 are coaxially arranged, so that the first assembling hole 111, the second assembling hole 125, and the straight tube portion 3 are communicated to one another in sequence. The visual ear pick 2 can be arranged in the first assembling hole 111, the second assembling hole 125, and the straight tube portion 3 in a penetrating manner in sequence, so that the connecting seat 11 and the pressing portion 12 are assembled on the handle portion 21 of the visual ear pick 2, and the straight tube portion 3 movably sleeves the hose portion 22 of the visual ear pick 2. This can facilitate the pressing portion 12 to drive the straight tube portion 3 to move on the hose portion 22.

As shown in FIG. 4, in some embodiments, the second assembling hole 125 is a threaded hole, and one end of the straight tube portion 3 is in threaded connection with the second assembling hole 125.

Specifically, a threaded structure can be arranged inside the second assembling hole 125, so that the second assembling hole 125 is the threaded hole. An external threaded structure can be provided at one end of the straight tube portion 3, so that one end of the straight tube portion 3 is in threaded connection with the second assembling hole 125. This can conveniently mount the straight tube portion 3 on the pressing portion 12 and remove the straight tube portion 3 from the pressing portion 12.

As shown in FIG. 1 and FIG. 4, in some embodiments, the connecting seat 11 is provided with an accommodating chamber structure 112; the accommodating chamber structure 112 is communicated to the first assembling hole 111; the visual ear pick 2 is inserted into the first assembling hole 111; and a portion of the visual ear pick 2 is located inside the accommodating chamber structure 112.

Specifically, the connecting seat 11 can be a similarly U-shaped structure that forms the accommodating chamber structure 112. Furthermore, the accommodating chamber structure 112 is communicated to the first assembling hole 111. When the visual ear pick 2 is inserted into the first assembling hole 111, a portion of the visual ear pick 2 can be located in the accommodating chamber structure 112. More clearly, the handle portion 21 of the visual ear pick 2 is located inside the accommodating chamber structure 112, and the connecting seat 11 abuts against the handle portion 21, so that the connecting seat 11 can be assembled on the visual ear pick 2 more firmly.

The above is only the preferred embodiments of the present disclosure, and is not intended to limit the present disclosure. Any modifications, equivalent replacements and improvements that are made within the spirit and principle of the present disclosure shall fall within the protection scope of the present disclosure.

The invention claimed is:

1. A tweezer part for a visual ear pick, applied to a visual ear pick and configured to drive a tweezer head assembled on the visual ear pick, wherein the tweezer part comprises:
   a driving portion, configured to be assembled on the visual ear pick; and
   a straight tube portion, wherein one end of the straight tube portion is connected to the driving portion, and the straight tube portion is configured to be movably arranged on the visual ear pick and to resist against the tweezer head;
   wherein the driving portion comprises:
   a U-shaped connecting seat, wherein the connecting seat is configured to be assembled on the visual ear pick; and
   a U-shaped pressing portion having two upper ends and a bottom, wherein the connecting seat is located in the pressing portion and connected to the pressing portion at the two upper ends of the pressing portion, and a gap is maintained between the pressing portion and the connecting seat; the one end of the straight tube portion, away from the tweezer head, is connected to the bottom of the pressing portion;
   wherein the tweezer part is configured in a manner that when the pressing portion is pressed, the bottom of the pressing portion deforms, and thus drives the straight tube portion to move towards the tweezer head in the axial direction of the straight tube portion, and the straight tube portion pushes the tweezer head, so that the tweezer head is in a clamping state; and
   when the pressing portion is released, the pressing portion returns to an original shape, and thus drives the straight tube portion to move away from the tweezer head in the axial direction of the straight tube portion, and the straight tube portion is separated from the tweezer head, so that the tweezer head is in a releasing state;

wherein the U-shaped pressing portion comprises:

two first elastic plates, wherein the two first elastic plates are arranged on two opposite sides of the connecting seat, and the two first elastic plates are respectively connected to two opposite side walls of the connecting seat; the gap is reserved between the two first elastic plates and the two opposite side walls of the connecting seat; and a second elastic plate, wherein two opposite ends of the second elastic plate are respectively connected to the two first elastic plates, thereby forming the U-shaped pressing portion; the one end of the straight tube portion, away from the tweezer head, is connected to the second elastic plate;

the tweezer part is configured in a manner that when the two first elastic plates are pressed towards each other, the two first elastic plates deform and drive the second elastic plate to deform away from the connecting seat; the second elastic plate drives the straight tube portion to move towards the tweezer head in the axial direction of the straight tube portion; and when the two first elastic plates are released, the two first elastic plates return to original shapes and drive the second elastic plate to return to an original shape; and the second elastic plate drives the straight tube portion to move away from the tweezer head in the axial direction of the straight tube portion.

2. The tweezer part for the visual ear pick according to claim 1, wherein the first elastic plates and the second elastic plate are arc-shaped plates, and the first elastic plates and the second elastic plate are bent away from the connecting seat.

3. The tweezer part for the visual ear pick according to claim 1, wherein the pressing portion further comprises:

connectors, wherein the connectors are arranged between the first elastic plates and a circumferential side wall of the connecting seat; one end of each connector is connected to each first elastic plate; and the other end of the connector is connected to the circumferential side wall of the connecting seat.

4. The tweezer part for the visual ear pick according to claim 1, wherein the U-shaped pressing portion comprises:

a U-shaped plate, wherein the connecting seat is arranged in the U-shaped plate; two opposite ends of the U-shaped plate are integrally connected to the connecting seat respectively; the gap is reserved between the U-shaped plate and the connecting seat; the one end of the straight tube portion, away from the tweezer head, is connected to the U-shaped plate;

the tweezer part is configured in a manner that when the U-shaped plate is pressed, the U-shaped plate deforms, and drives the straight tube portion to move towards the tweezer head in the axial direction of the straight tube portion; and when the U-shaped plate is released, the U-shaped plate returns to an original shape, to drive the straight tube portion to move away from the tweezer head in the axial direction of the straight tube portion.

5. The tweezer part for the visual ear pick according to claim 1, wherein the driving portion further comprises an elastic member; the elastic member is arranged between the connecting seat and the pressing portion; and two opposite ends of the elastic member are respectively connected to the connecting seat and the pressing portion.

6. The tweezer part for the visual ear pick according to claim 1, wherein the connecting seat is provided with a first assembling hole; the pressing portion is provided with a second assembling hole; and the first assembling hole and the second assembling hole are configured to insert the visual ear pick.

7. The tweezer part for the visual ear pick according to claim 6, wherein the straight tube portion is detachably connected to the second assembling hole, and the first assembling hole, the second assembling hole, and the straight tube portion are coaxially arranged.

8. The tweezer part for the visual ear pick according to claim 7, wherein the second assembling hole is a threaded hole, and one end of the straight tube portion is in threaded connection with the second assembling hole.

9. The tweezer part for the visual ear pick according to claim 6, wherein the connecting seat is provided with an accommodating chamber structure; the accommodating chamber structure is communicated to the first assembling hole; the accommodating chamber structure is configured to receive a first portion of the visual ear pick, and the first assembling hole is configured to allow a second portion of the visual ear pick to be inserted therein.

10. A visual ear pick set, comprising:

a visual ear pick comprising a handle portion, a hose portion connected to the handle portion, and a pick part or a tweezer head assembled at one end of the hose portion away from the handle portion; and a tweezer part comprising:

a driving portion comprising a connecting seat receiving the handle portion of the visual ear pick, and a U-shaped pressing portion having a first assembling hole for the hose portion passing therethrough, the connecting seat is located in the pressing portion and is connected to the pressing portion, and a gap is maintained between the pressing portion and the connecting seat; and a straight tube portion connected to the pressing portion, wherein the straight tube portion is movably arranged on the hose portion, the tweezer part is configured in a manner that when the pressing portion is pressed, a bottom of the pressing portion deforms, and thus drives the straight tube portion to move towards the pick part or the tweezer head to allow the pick part or the tweezer head work, and when the pressing portion is released, the pressing portion returns to an original shape, and thus drives the straight tube portion to move away from the pick part or the tweezer head;

wherein the U-shaped pressing portion comprises:

two first elastic plates, wherein the two first elastic plates are arranged on two opposite sides of the connecting seat, and the two first elastic plates are respectively connected to two opposite side walls of the connecting seat; the gap is reserved between the two first elastic plates and the two opposite side walls of the connecting seat; and a second elastic plate, wherein two opposite ends of the second elastic plate are respectively connected to the two first elastic plates, thereby forming the U-shaped pressing portion; one end of the straight tube portion, away from the tweezer head, is connected to the second elastic plate;

the tweezer part is configured in a manner that when the two first elastic plates are pressed towards each other, the two first elastic plates deform and drive the second elastic plate to deform away from the connecting seat; the second elastic plate drives the straight tube portion to move towards the tweezer head in the axial direction of the straight tube portion; and when the two first elastic plates are released, the two first elastic plates return to original shapes and drive the second elastic plate to return to an original shape; and the second elastic plate drives the straight tube portion to move away from the tweezer head in the axial direction of the straight tube portion.

11. The visual ear pick set according to claim 10, wherein the connecting seat is also U-shaped and has a second assembling hole for the hose portion passing therethrough.

12. The visual ear pick set according to claim 10, wherein the U-shaped pressing portion is a U-shaped plate, and the connecting seat is U-shaped and is arranged in the U-shaped plate; two opposite ends of the U-shaped plate are integrally connected to the connecting seat respectively; the gap is reserved between the U-shaped plate and the connecting seat; one end of the straight tube portion, away from the tweezer head, is connected to the U-shaped plate;

the tweezer part is configured in a manner that when the U-shaped plate is pressed, the U-shaped plate deforms, and drives the straight tube portion to move towards the tweezer head in the axial direction of the straight tube portion; and when the U-shaped plate is released, the U-shaped plate returns to an original shape, to drive the straight tube portion to move away from the tweezer head in the axial direction of the straight tube portion.

* * * * *